United States Patent
D'Anna et al.

(10) Patent No.: US 10,921,508 B2
(45) Date of Patent: Feb. 16, 2021

(54) CURVED LIGHT GUIDE ASSEMBLY

(71) Applicant: ABL IP Holding LLC, Atlanta, GA (US)

(72) Inventors: Kevin D'Anna, Atlanta, GA (US); Fardin Faruque, Grayson, GA (US); Clifford Wood, Grayson, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/811,028

(22) Filed: Mar. 6, 2020

(65) Prior Publication Data
US 2020/0284970 A1 Sep. 10, 2020

Related U.S. Application Data

(60) Provisional application No. 62/815,824, filed on Mar. 8, 2019.

(51) Int. Cl.
*F21V 8/00* (2006.01)

(52) U.S. Cl.
CPC ......... *G02B 6/0065* (2013.01); *G02B 6/0055* (2013.01); *G02B 6/0068* (2013.01); *G02B 6/0073* (2013.01); *G02B 6/0088* (2013.01); *G02B 6/0091* (2013.01)

(58) Field of Classification Search
CPC .. G02B 6/0065; G02B 6/0073; G02B 6/0055; G02B 6/0091; G02B 6/0088; G02B 6/0068
See application file for complete search history.

(56) References Cited

U.S. PATENT DOCUMENTS

| | | |
|---|---|---|
| 7,229,191 B1 | 6/2007 | Plunk et al. |
| D620,190 S | 7/2010 | Chung et al. |
| D636,112 S | 4/2011 | Chung et al. |
| 8,047,673 B2 | 11/2011 | Santoro |
| 8,201,965 B2 | 6/2012 | Yamada et al. |
| D698,969 S | 2/2014 | Johns et al. |
| 8,833,969 B2 | 9/2014 | Speier et al. |
| 9,684,115 B1 | 6/2017 | Carney et al. |
| 10,001,593 B1 | 6/2018 | Carney et al. |
| D838,406 S | 1/2019 | Parker |
| 2010/0220497 A1 | 9/2010 | Ngai |
| 2010/0246208 A1 | 9/2010 | Iwasaki |
| 2011/0013420 A1* | 1/2011 | Coleman .............. G02B 6/0061 362/612 |
| 2015/0167902 A1 | 6/2015 | Rodgers et al. |
| 2019/0196082 A1* | 6/2019 | Jeong ................ G02F 1/133305 |

* cited by examiner

*Primary Examiner* — Donald L Raleigh
(74) *Attorney, Agent, or Firm* — Kilpatrick Townsend & Stockton LLP

(57) ABSTRACT

A method of assembling a light fixture includes assembling a light guide into a backing structure. The backing structure includes a sheet and first and second flanges at two opposite edges of the sheet. A row of light emitting diodes (LEDs) is installed on the first flange, positioned to direct light away from the first flange and toward the second flange, and generally parallel with the major surfaces of the flat sheet. The light guide is positioned between the flanges and against the backing structure. The width of the light guide is less than the distance between the LEDs and the second flange. The backing structure and the light guide are bent toward a bottom surface of the backing structure such that the flanges are drawn toward each other and such that the LEDs are drawn toward an input face of the light guide.

20 Claims, 8 Drawing Sheets

CURVED LIGHT GUIDE ASSEMBLY

This application claims the benefit of U.S. Provisional Patent Application No. 62/815,824 filed Mar. 8, 2019 and titled "Curved Light Guide Assembly", the entire disclosure of which is hereby incorporated by reference herein for all purposes.

BACKGROUND OF THE INVENTION

Some light fixtures use light guides to redirect light from light sources to a desired area. Light is accepted into one or more edge faces of the light guide and transported across the light guide via total internal reflection. The light is extracted through a bottom face of the light guide using scattering features placed on a top side of the light guide. Improvements are desired in the assembly of such fixtures.

BRIEF SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings, and each claim.

According to a first aspect, a method of assembling a light fixture comprises providing a light guide having top and bottom major surfaces and two parallel edge faces between the top and bottom major surfaces, the edge faces being on opposite sides of the light guide, and the two edge faces being separated by a width of the light guide. The method further comprises providing a backing structure comprising a sheet having top and bottom major surfaces and first and second flanges at two opposite edges of the sheet, the first and second flanges being generally perpendicular to the major surfaces of the sheet and generally parallel to each other when the sheet is flat, and extending away from the bottom major surface of the flat sheet. The method further comprises installing a row of light emitting diodes on the first flange, the light emitting diodes positioned to direct light away from the first flange and toward the second flange, and generally parallel with the major surfaces of the flat sheet. The method further comprises positioning one of the major surfaces of the light guide adjacent the bottom major surface of the sheet with the light guide between the flanges of the backing structure, wherein one of the two parallel edge faces of the light guide is near the row of light emitting diodes and the other of the parallel edge faces of the light guide is near the second flange, wherein the distance between the light emitting diodes and the second flange is larger than the width of the light guide by a gap distance. The method further comprises bending the backing structure and the light guide such that the bottom major surface of the backing structure is concave and the first and second flanges are drawn toward each other, and such that the light emitting diodes and the second flange are drawn toward the parallel edge faces of the light guide, to close the gap distance.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
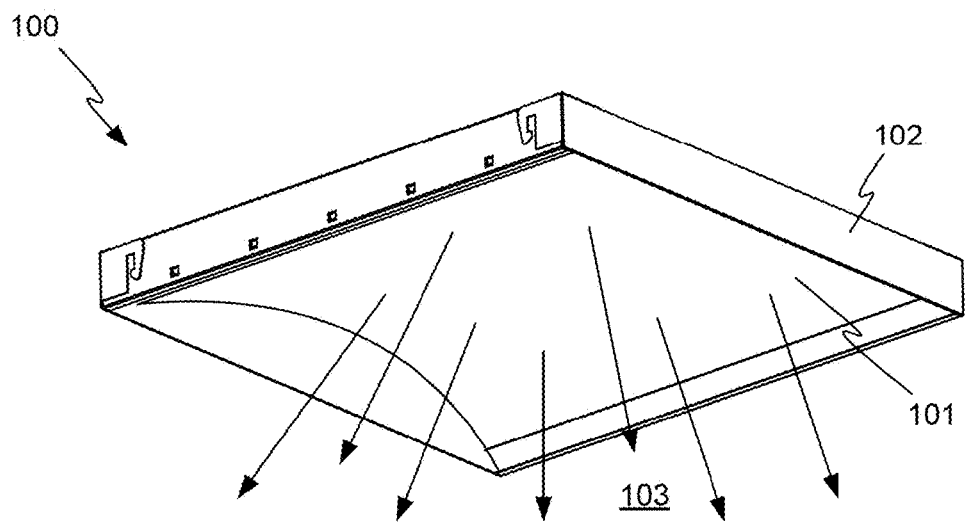
FIG. 1 is a lower oblique view of a light fixture in accordance with embodiments of the invention.

FIG. 1 is a lower oblique view of a light fixture 100 in accordance with embodiments of the invention. The light fixture 100 includes a curved light guide 101 in a housing 102. Light 103 emanates from the bottom surface of the light guide 101.

Figure 2:
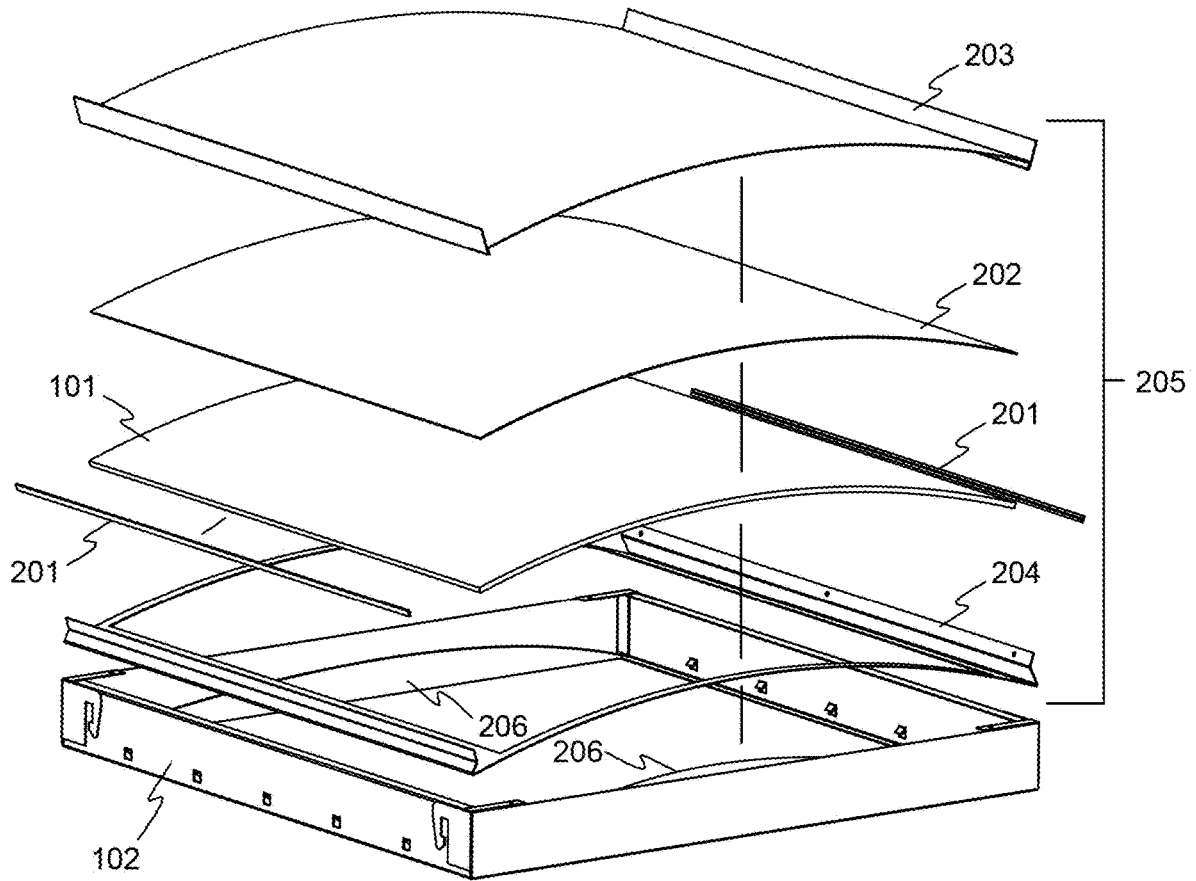
FIG. 2 is an exploded view of the light fixture of FIG. 1, showing a light guide assembly, in accordance with embodiments of the invention.

FIG. 2 is an exploded view of the light fixture 100, in accordance with embodiments of the invention. Printed circuit boards 201 holding light emitting diodes (LEDs) are placed at one or both edges of the light guide 101. The printed circuit boards 201 are connected to a driver circuit that supplies power to the LEDs on the printed circuit boards 201, but the driver is not shown in FIG. 2. A reflective sheet 202 is placed over and in contact with the light guide 101. The light guide 101 and reflective sheet 202 are sandwiched between a back frame 203 and a front frame 204. The back frame 203 may be a continuous sheet without openings as shown, or may have openings if desired. The front frame 204 defines a large opening through which light from the light guide 101 will emanate. The housing 102 has raised end walls 206 having curved edges, that will determine the curvature of the light guide 101, as is explained in more detail below. The light guide 101, circuit boards 201, reflective sheet 202, back frame 203, and front frame 204 may be collectively referred to as a light guide assembly 205.

Figure 3:
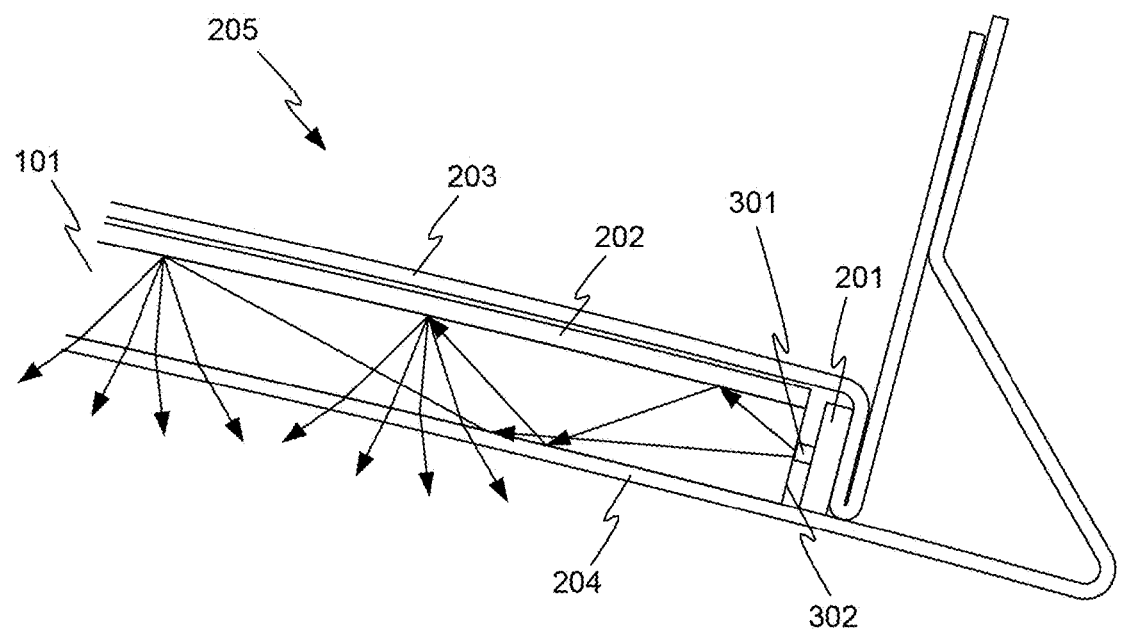
FIG. 3 shows an end detail view of one edge of the light guide assembly of FIG. 2 in its completed state, in accordance with embodiments of the invention.

FIG. 3 shows an end detail view of one edge of the light guide assembly 205, in accordance with embodiments of the invention. One of LEDs 301 is shown emitting light into an entrance face 302 of the light guide 101. The light that enters the light guide 101 at less than the critical angle travels through the light guide 101 by total internal reflection (TIR) until it encounters a scattering feature on the top surface of the light guide 101. The scattering feature may be a bump or divot or other texture feature formed into the light guide 101 itself, or may be a dot of paint on the top surface of the light guide 101, or may be an area of intimate contact between the light guide 101 and the reflective sheet 202, or may be any other feature that destroys the total internal reflection of light from the top surface of the light guide 101. If no scattering feature is encountered immediately, the light may travel through the light guide 101 by successively reflecting from the smooth top and bottom surfaces of the light guide 101, so that light is distributed across the light guide 101.

In a preferred embodiment, the light guide 101 includes an etched or otherwise patterned top surface that serves as the scattering features. The scattering features are preferably spaced to extract light substantially uniformly across the light guide 101. The scattered light is directed out the bottom surface of the light guide 101, to light the space below the light fixture 100. The reflective sheet 202 serves to re-direct any light that may scatter upward out of the light guide 101 back downward to exit the bottom face of the light guide 101.

It is desirable that the LEDs 301 be held against the entrance face 302 of the light guide 101, to ensure maximum capture of the light from the LED 301 into the light guide 101. In some embodiments, the LEDs 301 maybe provided with registration features, for example bumps on the packages of the LEDs 301 raised slightly above the light emitting surface. (No registration features are visible in FIG. 3.) In other embodiments, the LEDs 301 may lack any raised registration features. In either case, this disclosure may refer to the LEDs being against or in contact with the light guide 101, whether or not raised registration features are present. In any event, due to the complex geometry of the parts of the light guide assembly 205 and the natural variation in the sizes of the parts due to manufacturing tolerances, it may be difficult to construct the light guide assembly 205 in its final form, with the LEDs 301 against the edges of the light guide 101.

In accordance with embodiments of the invention, the parts of light guide assembly 205 are assembled in a flat state, and then the entire light guide assembly 205 is bent and mounted in the housing 102. The parts of the light guide assembly 205 are fabricated to provide clearance gaps between the LEDs 301 and the light guide 101 in the flat state, and the parts are shaped such that the bending of the light guide assembly 205 closes the clearance gaps to bring the LEDs 301 into contact with the light guide 101.

Figure 4:
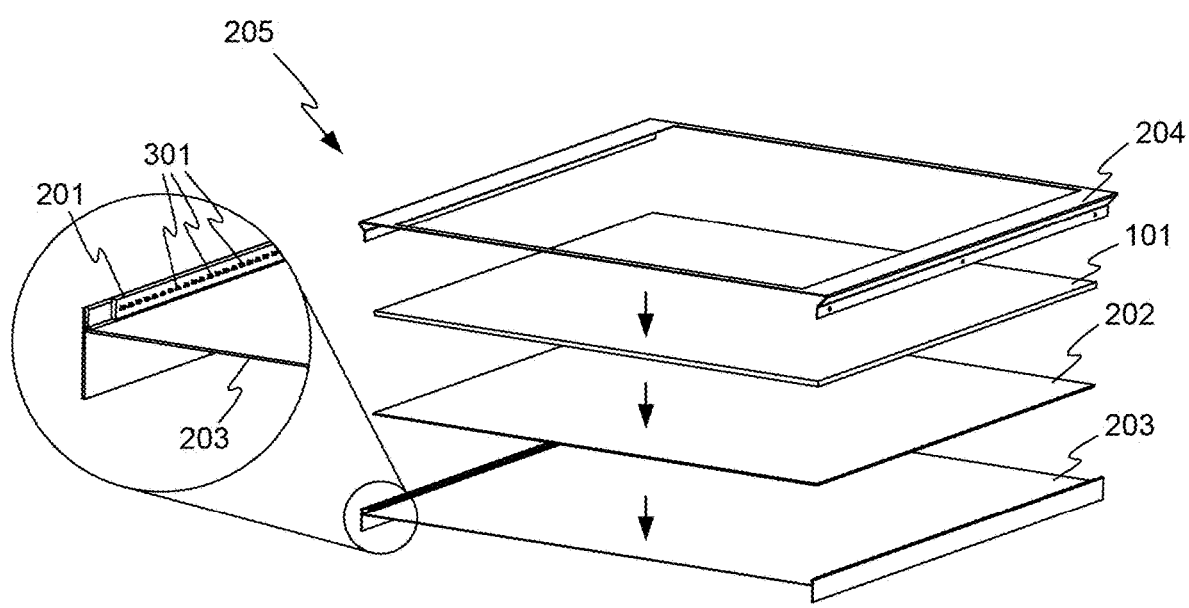
FIG. 4 is an exploded view of the light guide assembly of FIG. 2 and its sequence of assembly, in accordance with embodiments of the invention.
Figure 5:
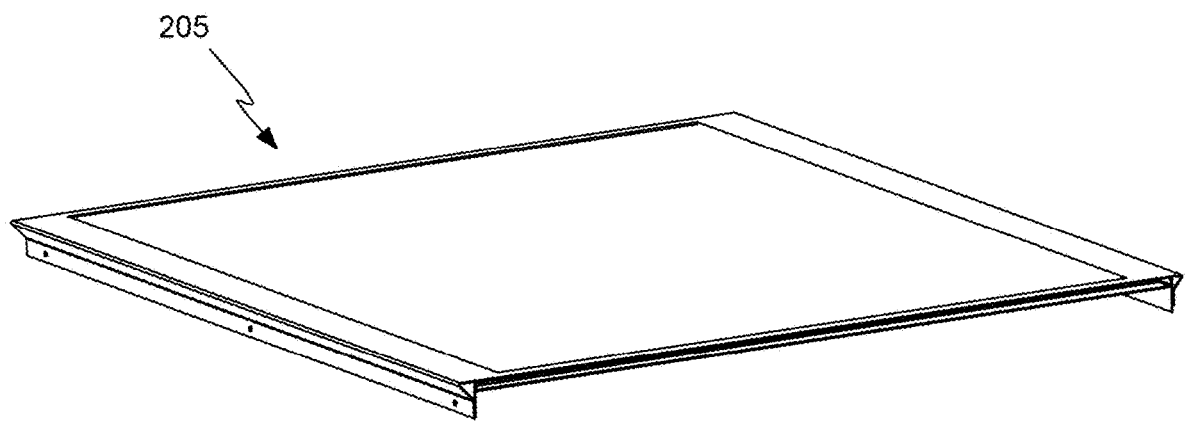
FIG. 5 shows the light guide assembly of FIG. 2 in its flat assembled state.

FIG. 4 is an exploded view of the light guide assembly 205 and its sequence of assembly, in accordance with embodiments of the invention. FIG. 5 shows the light guide assembly 205 in its flat assembled state.

Figure 6:
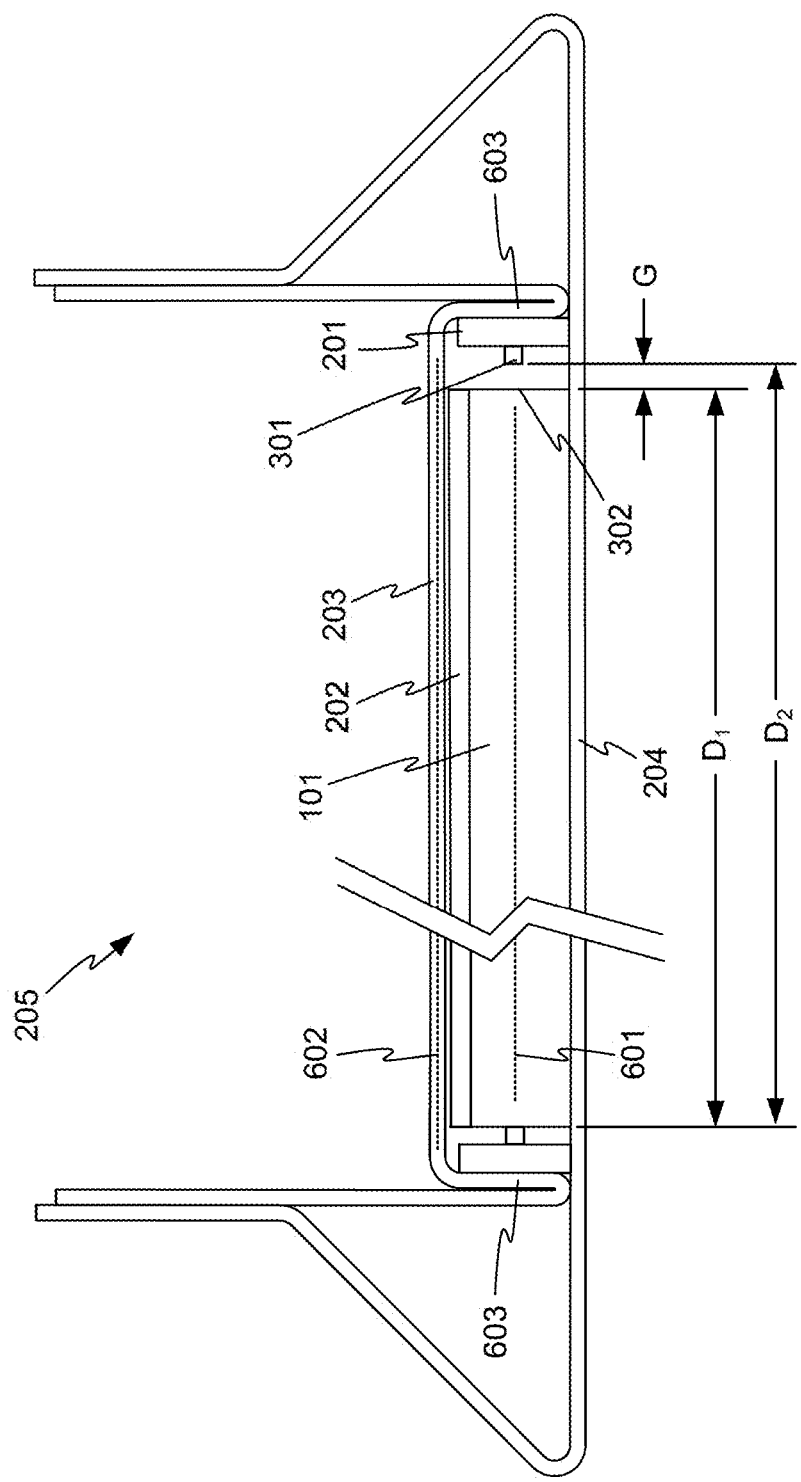
FIG. 6 shows an end detail view of the light guide assembly of FIG. 2 in its flat assembled state.

FIG. 6 shows an end detail view of the light guide assembly 205 in its flat assembled state. As is apparent, the nominal length $D_1$ of light guide 101 is smaller than the nominal distance $D_2$ between the LEDs 301 on the two sides of the light guide assembly 205, leaving a gap distance G. The distance $D_2$ is determined in part by the placement of depending flanges 603 of the back frame 203, against which the circuit boards 201 are placed. While gap G is shown as being on only one side of the light guide assembly 205, it may be on the other side, or distributed between the two sides.

In one embodiment, the nominal length $D_1$ of the light guide 101 is 571.42 mm and the nominal distance $D_2$ between the LEDs is 573.62 mm, leaving a difference G of 2.2 mm. In other embodiments, different sizes of components may be used, depending on the size of the light fixture being constructed, the desired curvature of the light guide 101, or other factors.

Also indicated in FIG. 6 are light guide neutral axis 601 of the light guide 101 and frame neutral axis 602 of the main portion of the back frame 203. The neutral axis of a mechanical element is an axis in the cross section of the element along which there are no longitudinal stresses or strains when the element is bent. The neutral axis does not change length during bending of the element.

In the light guide assembly 205, the neutral axis of the light guide 101 is essentially through the center of the rectangular light guide 101. Even if the reflective sheet 202 is attached to the light guide 101, it does not generally have a significant effect on the location of the light guide neutral axis 601 because the light guide 101 may typically be made of a much stiffer material than the reflective sheet 202. For example, the light guide 101 may be made of acrylic (having a Young's modulus of about 3.2 GPa), polycarbonate (having a Young's modulus of about 2.6 GPa), or another similar material having similar modulus. Young's modulus is also sometimes referred to as the modulus of elasticity. The reflective sheet 202 may be made of a flexible polymer material such as a rubberized material, or a woven mesh, and may have a Young's modulus much lower than that of the light guide 101, for example 5 MPa or less.

Figure 7:
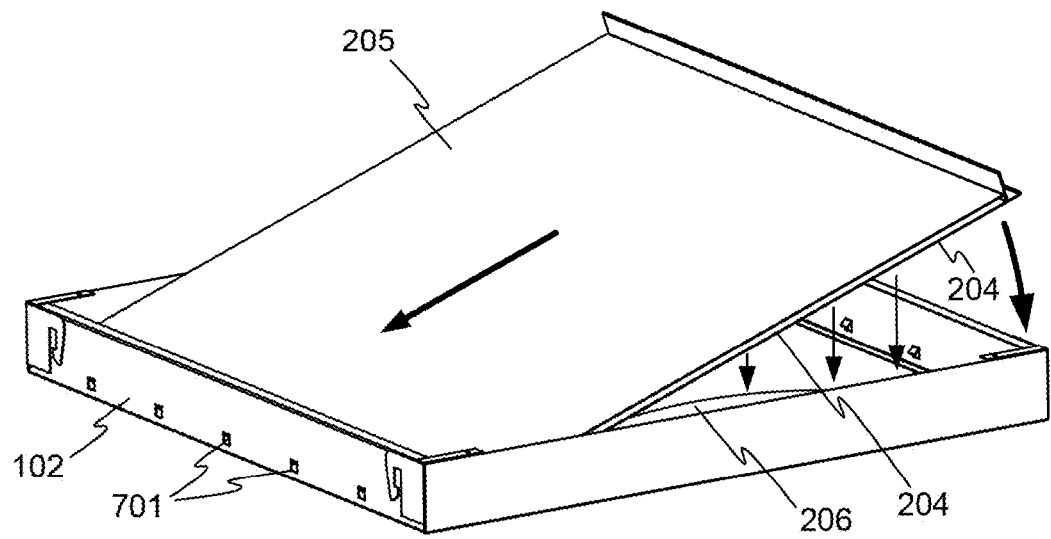
FIG. 7 illustrates the attachment of the light guide assembly of FIG. 2 to a housing to form the light fixture of FIG. 1.

FIG. 7 illustrates the final attachment of the light guide assembly 205 to the housing 102 to form the light fixture 100. The light guide assembly 205 is placed with one of its edges in one side the housing 102. The edge may be constrained in the housing, for example by hooking it under clips 701 formed into the housing 102. The free edge of the light guide assembly is then lowered into place in the opposite side of the housing 102. In the process, the front frame 204 of the light guide assembly 205 rolls onto the curved edges of the end walls 206, setting the curvature of the light guide 101 in the completed assembly.

Figure 8:
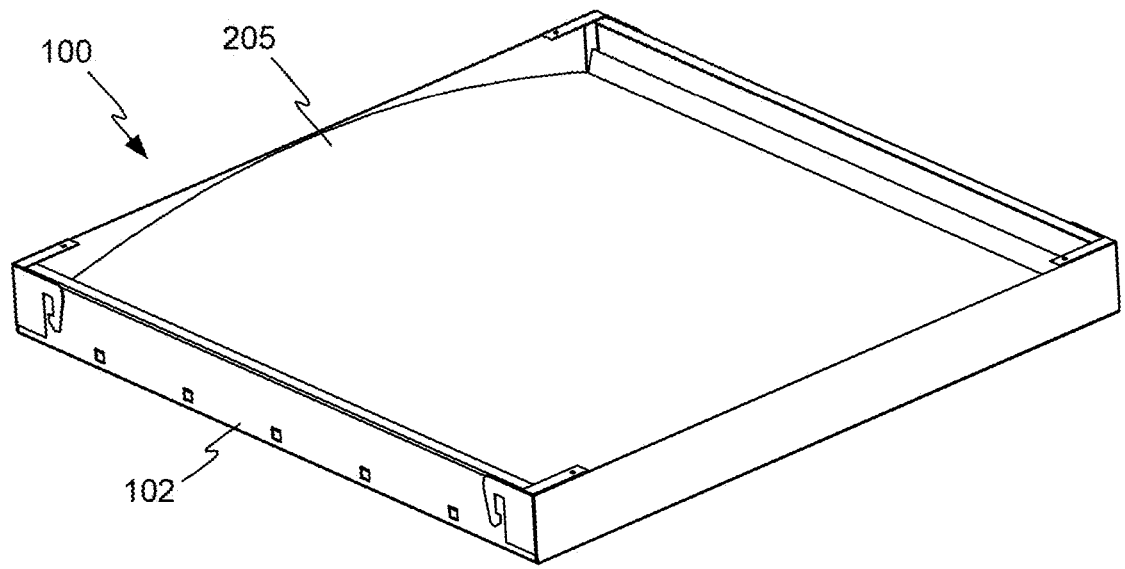
FIG. 8 is an upper oblique view of the light fixture of FIG. 1.

The assembled fixture 100 is shown in FIG. 8. Other components may be present but are not shown in FIG. 8 for simplicity. For example, a driver circuit may be present in the housing 102 to convert high voltage mains power to low voltage power required by the LEDs 301. One or more covering panels may be present to more fully enclose the housing 102. Additional mounting features may be present.

As the light guide assembly 205 is bent, the light guide does not change in length along its neutral axis 601, which is substantially aligned with the LEDs 301. However, the distance between the two circuit boards 201, and therefore between the LEDs 301 on the opposite sides of the fixture 100, reduces. This is because as the back frame 203 bends along its neutral axis 602, the depending flanges 603 are angled inward, bringing them closer together, and bringing the circuit boards 201 on opposite sides of the light guide assembly 205 closer together as well. This effect is shown in FIG. 9 in an exaggerated manner.

Figure 9:
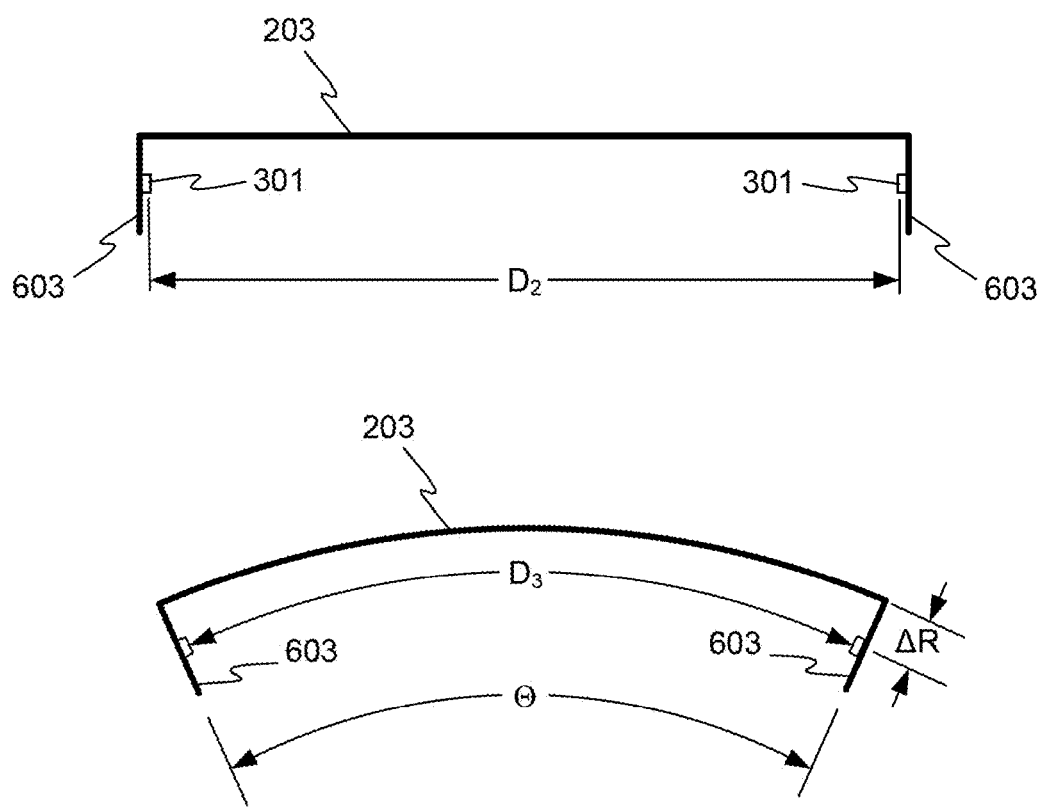
FIG. 9 illustrates the effect of bending the light guide assembly of FIG. 2, in accordance with embodiments of the invention.

In the upper configuration of FIG. 9 (in the flat state), the depending flanges 603 of the back frame 203 are perpendicular to the flat main portion of the back frame 203, and the distance between LEDs 301 is $D_2$. However, in the lower configuration, the bending of the main portion of the back frame 203 has tilted the depending flanges 603 inward, bringing their tips closer together, and also bringing the LEDs 301 closer together. The arcuate distance between the LEDs is now $D_3$, which differs from $D_2$ according to $$D_3 = D_2 - \Delta R * \Theta$$

when $\Theta$ is measured in radians. The change in separation of the LEDs is given by $$D_2 - D_3 = \Delta R * \Theta.$$

In the example of FIGS. 1-8, the light guide 101 is about 4.953 mm thick, the reflective sheet 202 is about 1.0 mm thick, the back frame 203 is made of sheet metal and is about 0.762 mm thick. In addition, a small nominal clearance is present between the reflective sheet 202 and the back frame 203, such that $\Delta R \cong 4.09$ mm. Also, $\Theta = 35.15° = 0.613$ radians. The nominal clearance may be left empty or may be filled with any suitable material, for example a foam or other material. The clearance may be provided to accommodate the necessary width of the circuit boards 201, so that the LEDs 301 can be nominally aligned with the center of the entrance face 302 of the light guide 101.

Thus, the change in the distance between the LEDs is $D_2 - D_3 = \Delta R * \Theta = 2.50$ mm. This is slightly larger than the nominal total gap distance G of 2.20 mm, so the bending of the light guide assembly 205 will bring the LEDs 301 against the light guide 101 even if the gap G is slightly larger than nominal due to manufacturing and assembly variations. The depending flanges 603 and other parts can flex slightly to accommodate the nominal interference without damaging the LEDs 301 or the light guide 101.

Figure 10A:
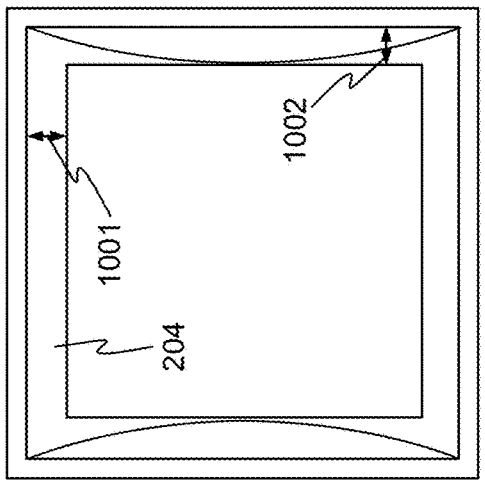
FIGS. 10A-10F illustrate light fixtures according to various embodiments of the invention.
Figure 10B:
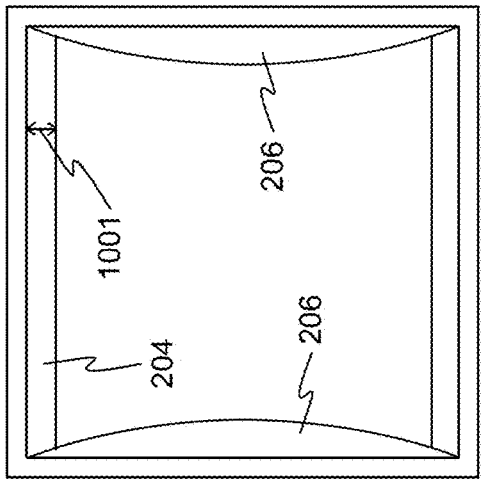
Figure 10C:
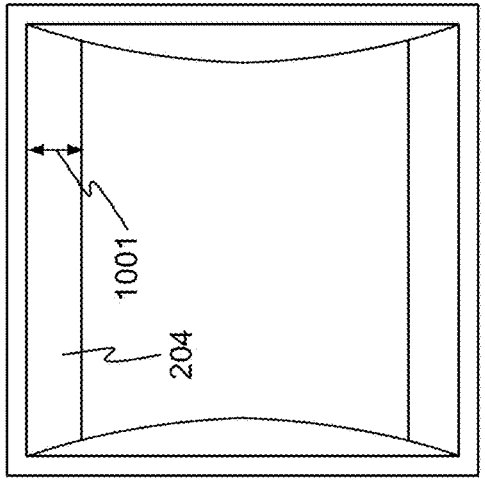
Figure 10D:
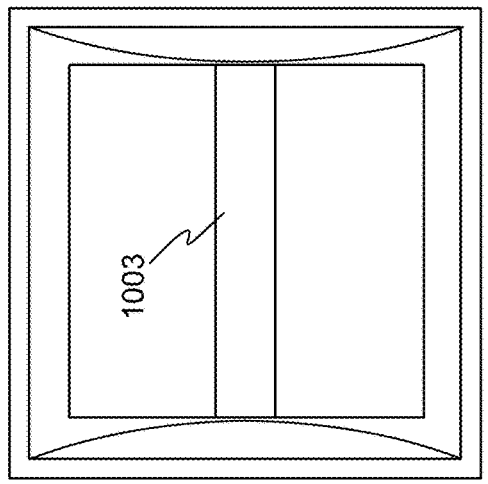
Figure 10E:
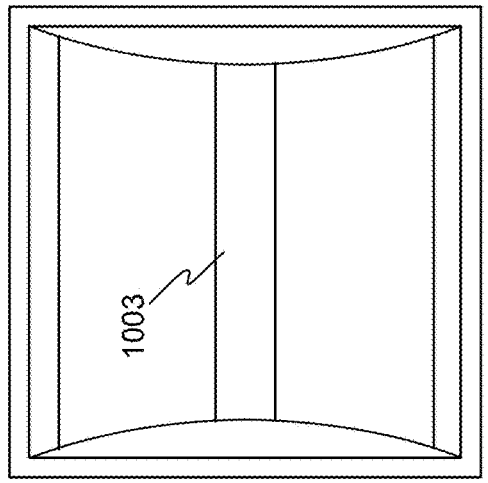
Figure 10F:
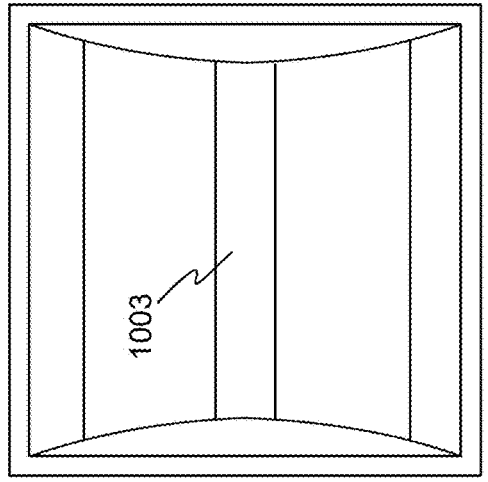

The dimensions given above are examples only, and a wide variety of other part sizes are possible in accordance with embodiments of the invention. FIGS. 10A-10F illustrate light fixtures according to various embodiments of the invention, as viewed from directly below. Variations are shown in the widths 1001 and 1002 of sides of the front frame 204, and in the presence or absence of a central bar 1003 of the front frame 204. For example, the light fixture of FIG. 10A has a relatively wide front frame 204 horizontal width 1001 and a relatively wide front frame 204 vertical width 1002. The fixture of FIG. 10B has a very narrow front frame 204 vertical width (such that the front frame 204 is not visible behind end walls 206), and a relatively narrow front frame 204 horizontal width 1001. The fixture of FIG. 10C is similar to the fixture of FIG. 10B, but has a larger frame 204 horizontal width 1001. The fixtures of FIGS. 10D-10F are similar to the fixtures of FIGS. 10A-10C, except for the addition of a central bar 1003 of the front frame 204, which gives the fixtures the appearance of having two light panels.

Figure 11A:
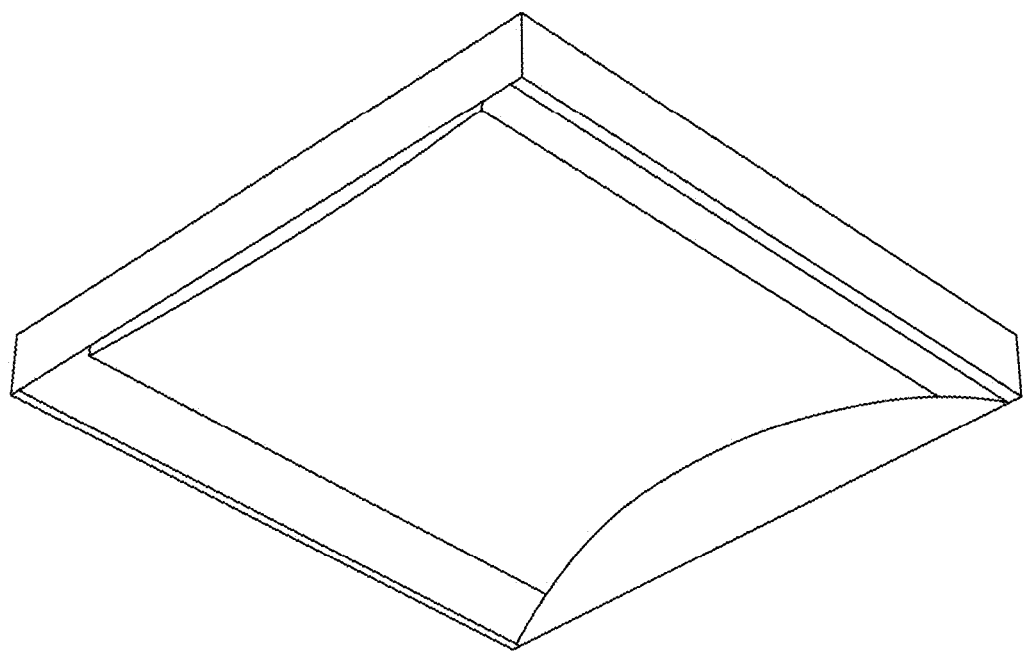
FIG. 11A shows a lower oblique view of the light fixture of FIG. 10C.
Figure 11B:
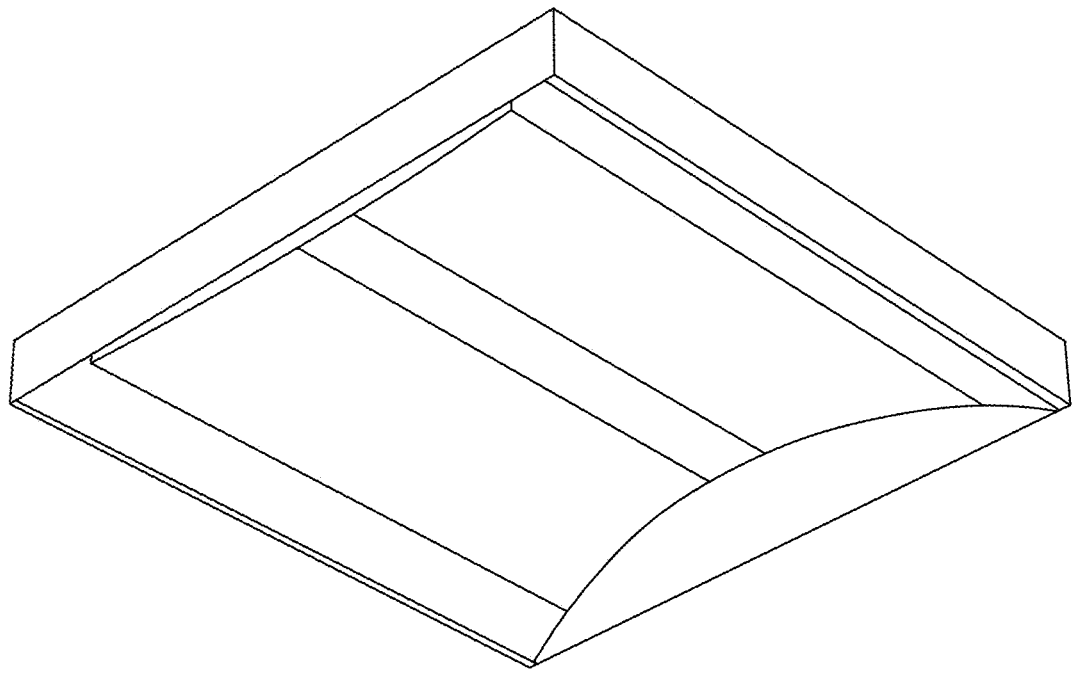
FIG. 11B shows a lower oblique view of the light fixture of FIG. 10F.

FIG. 11A shows a lower oblique view of the light fixture of FIG. 10C, and FIG. 11B shows a lower oblique view of the light fixture of FIG. 10F, for additional clarity.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents. It is to be understood that any workable combination of the features and capabilities disclosed herein is also considered to be disclosed.

What is claimed is:

1. A method of assembling a light fixture, the method comprising:
    providing a light guide having top and bottom major surfaces and two parallel edge faces between the top and bottom major surfaces, the edge faces being on opposite sides of the light guide, and the two edge faces being separated by a width of the light guide;
    providing a backing structure comprising a sheet having top and bottom major surfaces and first and second flanges at two opposite edges of the sheet, the first and second flanges being generally perpendicular to the major surfaces of the sheet and generally parallel to each other when the sheet is flat, and extending away from the bottom major surface of the sheet;
    installing a row of light emitting diodes on the first flange, the light emitting diodes positioned to direct light away from the first flange and toward the second flange, and generally parallel with the major surfaces of the sheet;
    positioning one of the major surfaces of the light guide adjacent the bottom major surface of the sheet with the light guide between the flanges of the backing structure, wherein one of the two parallel edge faces of the light guide is near the row of light emitting diodes and the other of the parallel edge faces of the light guide is near the second flange, wherein the distance between the light emitting diodes and the second flange is larger than the width of the light guide by a gap distance; and
    bending the backing structure and the light guide such that the bottom major surface of the backing structure is concave and the first and second flanges are drawn toward each other, and such that the light emitting diodes and the second flange are drawn toward the parallel edge faces of the light guide, to close the gap distance.

2. The method of claim 1, further comprising installing the light guide and the backing structure in a housing.

3. The method of claim 2, wherein the housing comprises two end plates having curved edges, and wherein bending the backing structure and the light guide comprises bending the light guide and backing structure against the two curved edges of the housing.

4. The method of claim 1, further comprising installing a reflective sheet between the sheet of the backing structure and the light guide.

5. The method of claim 1, further comprising installing a front frame on the lower face of the light guide, the front frame defining an opening through which light from the light fixture is directed.

6. The method of claim 1, wherein the first and second flanges flex to accommodate interference between the light guide and the row of light emitting diodes.

7. The method of claim 1, wherein the neutral axis of the light guide is displaced from the neutral axis of the backing sheet.

8. A method of assembling a light fixture, the method comprising:
    providing a light guide having top and bottom major surfaces and two parallel edge faces between the top and bottom major surfaces, the edge faces being on opposite sides of the light guide, and the two edge faces being separated by a width of the light guide;
    providing a backing structure comprising a sheet having top and bottom major surfaces and first and second flanges at two opposite edges of the sheet, the first and second flanges being generally perpendicular to the major surfaces of the sheet and generally parallel to each other when the sheet is flat, and extending away from the bottom major surface of the sheet;

installing a first row of light emitting diodes on the first flange and a second row of light emitting diodes on the second flange, the light emitting diodes positioned to direct light away from the respective flanges to which they are installed, and generally parallel with the major surfaces of the sheet;

positioning one of the major surfaces of the light guide adjacent the bottom major surface of the sheet with the light guide between the flanges of the backing structure, wherein one of the two parallel edge faces of the light guide is near the first row of light emitting diodes and the other of the parallel edge faces of the light guide is near the second row of light emitting diodes, wherein the distance between the two rows of light emitting diodes is larger than the width of the light guide by a gap distance; and bending the backing structure and the light guide such that the bottom major surface of the backing structure is concave and the first and second flanges are drawn toward each other, and such that the first and second rows of light emitting diodes are drawn toward the respective parallel edge faces of the light guide, to close the gap distance.

9. The method of claim 8, further comprising installing the light guide and the backing structure in a housing.

10. The method of claim 9, wherein the housing comprises two end plates having curved edges, and wherein bending the backing structure and the light guide comprises bending the light guide and backing structure against the two curved edges of the housing.

11. The method of claim 8, further comprising installing a reflective sheet between the sheet of the backing structure and the light guide.

12. The method of claim 8, further comprising installing a front frame on the lower face of the light guide, the front frame defining an opening through which light from the light fixture is directed.

13. The method of claim 8, wherein the first and second flanges flex to accommodate interference between the light guide and the first and second rows of light emitting diodes.

14. The method of claim 8, wherein the neutral axis of the light guide is displaced from the neutral axis of the backing sheet.

15. A light fixture, comprising:
a curved light guide having top and bottom major surfaces, and having first and second edge faces between the top and bottom major surfaces, the edge faces being on opposite sides of the light guide;

a curved backing structure comprising a sheet having top and bottom major surfaces and first and second flanges at two opposite edges of the sheet, the first and second flanges being generally perpendicular to the major surfaces of the sheet, and extending away from the bottom major surface of the sheet, wherein the curvature of the curved backing structure and the curvature of the light guide conform to each other; and a row of light emitting diodes on the first flange, the light emitting diodes positioned to direct light away from the first flange and into the first edge face of the light guide, and wherein the row of light emitting diodes is in contact with the first edge face of the light guide, and the light guide is pushed against the row of light emitting diodes by the first and second flanges;

wherein the light guide and the backing structure are sized such that in a flattened state, the distance between the first and second edges of the light guide is less than the distance between the row of light emitting diodes and the second flange.

16. The light fixture of claim 15, wherein the neutral axis of the light guide is displaced from the neutral axis of the backing structure, such that the curvature of the light guide and the curvature of the backing structure serve to bring the flanges closer together in the curved state than in a flat state, as measured along the neutral axis of the light guide, to push the light guide against the row of light emitting diodes.

17. The light fixture of claim 16, further comprising a reflective sheet between the top major surface of the light guide and the bottom major surface of the backing structure.

18. The light fixture of claim 17, wherein the row of light emitting diodes is a first row of light emitting diodes, the light fixture further comprising:
a second row of light emitting diodes between the second flange and the second edge of the light guide, the second row of light emitting diodes positioned to direct light away from the second flange and into the second edge face of the light guide.

19. The light fixture of claim 17, further comprising a housing in which the light guide and the backing structure are disposed.

20. The light fixture of claim 19, wherein the housing comprises two end plates having curved edges, and the curvature of the end plate edges conforms to the curvature of the light guide.

* * * * *